United States Patent

Yoshizaki et al.

Patent Number: 5,422,082
Date of Patent: Jun. 6, 1995

[54] ELECTRICALLY HEATABLE CATALYTIC CONVERTER

[75] Inventors: Kouji Yoshizaki, Susono; Takuzou Kako, Chiyoda, both of Japan

[73] Assignees: Toyota Jidosha Kabushiki Kaisha, Toyota; Nippon Steel Corporation, Tokyo, both of Japan

[21] Appl. No.: 49,193

[22] Filed: Apr. 19, 1993

[30] Foreign Application Priority Data

Apr. 20, 1992 [JP] Japan .................. 4-099597
May 21, 1992 [JP] Japan .................. 4-128871

[51] Int. Cl.⁶ ............................. F01N 3/20
[52] U.S. Cl. ..................... 422/174; 422/180; 60/300
[58] Field of Search ............ 422/174, 180; 60/300

[56] References Cited

U.S. PATENT DOCUMENTS

| | | | |
|---|---|---|---|
| 3,768,982 | 10/1973 | Kitzner et al. | 422/174 |
| 3,770,389 | 10/1973 | Kitzner et al. | 60/300 |
| 5,070,694 | 12/1991 | Whittenberger | 60/300 |
| 5,140,812 | 8/1992 | Cornelison et al. | 422/174 |
| 5,146,743 | 9/1992 | Maus et al. | 60/300 |
| 5,174,968 | 12/1992 | Whittenberger | 422/174 |
| 5,215,722 | 6/1993 | Nishizawa | 422/180 |

FOREIGN PATENT DOCUMENTS

| | | | |
|---|---|---|---|
| 10470 | 11/1989 | Germany . | |
| 503445 | 9/1992 | Germany | F01N 3/20 |
| 3-500911 | 2/1991 | Japan . | |
| WO92/18245 | 10/1992 | WIPO | F01N 3/20 |

Primary Examiner—Robert J. Warden
Assistant Examiner—Hien Tran
Attorney, Agent, or Firm—Kenyon & Kenyon

[57] ABSTRACT

An electrically heatable catalytic converter for converting pollutant materials from an engine, such as carbon monoxide, unburned hydrocarbons, nitrogen oxides, etc., to carbon dioxide, nitrogen and water. A catalytic core has a rod center electrode, metal strips, such as corrugated strips and plane strips, and insulation layers spirally wound together about the center electrode to form a spiral electrical path. The central region adjacent to the center electrode and the peripheral region of the catalytic core are wound without intervening of the insulation layer and contact metal to metal. The intermediate region of the core is mainly heated, and there is almost no heat generation in the central and peripheral regions of the catalytic core.

25 Claims, 3 Drawing Sheets

ELECTRICALLY HEATABLE CATALYTIC CONVERTER

BACKGROUND OF THE INVENTION

1. Field of the Invention

This invention relates to an electrically heatable catalytic converter which is used for converting pollutant materials produced by an engine, for example, carbon monoxide (CO), unburned hydrocarbons (HC), nitrogen oxides etc., to carbon dioxide, nitrogen and water.

2. Description of Prior Art

An electrically heatable catalytic converter having a cylindrical catalytic core comprising a thin metal strip (usually consisting of a corrugated strip and a plane strip), and an insulation layer superimposed and spirally wound together, a cylindrical metal case for accommodating therein said catalytic core, and an electric source supplying means for electrically heating said metal strip, has been conventionally known in the prior art, such as disclosed in U.S. Pat. No. 5,070,694.

Japanese Unexamined Patent Publication (Kohyo) NO. 3-500911 discloses such a catalytic converter, in which the insulation layer extends to the outer periphery of the cylindrical catalytic core which is secured to the inner surface of the metal case.

To meet the recent requirements for the severe control of exhaust gas, HC and CO must be reduced during the engine starting condition. Thus, the catalytic core must rapidly be heated to the catalytic activation temperature.

In the known electrically heatable catalytic converter, however, since the insulation layer extends all over the catalytic core, i.e., the insulation layer exists in the entire region of the catalytic core. For example, if a relatively small volume of 100 cc must be heated up to 400° C. in 10 sec., a large electric power, such as more than 2-3 kW, is necessary. Therefore, a larger power supply system including an existing battery is required. Thus, new problems on weight, cost, fuel consumption and so forth will arise.

SUMMARY OF THE INVENTION

An object of the present invention is to provide an electrically heatable catalytic converter having a sufficient durability, particularly to thermal stress.

Another object of the present invention is to provide an electrically heatable catalytic converter capable of operating with reduced electric power requirements.

According to one aspect of the present invention, there is provided an electrically heatable catalytic converter for converting pollutant materials from an engine, such as carbon monoxide, unburned hydrocarbons, nitrogen oxides etc., to carbon dioxide, nitrogen and water, said converter comprising: a catalytic core comprising at least one metal strip and at least one insulation layer spirally wound together to form a spiral electrical path, said catalytic core having a peripheral region thereof, in which only said metal strip is wound without an intervening insulation layer and contacts as metal to metal; a metal case for accommodating said catalytic core in such a manner that said peripheral region of the catalytic core directly contacts said metal case; and means for supplying electric power to said catalytic core.

According to this embodiment of the present invention, the insulation layer does not exist in the peripheral region of the catalytic core and therefore the electrical resistance in this region is very small. Therefore, thermal durability can be improved in the peripheral region which is subjected repeatedly to a relatively large thermal stress. In addition, the outer periphery of the catalytic core can be firmly secured to the metal case.

According to another aspect of the present invention, there is provided an electrically heatable catalytic converter for converting pollutant materials from an engine, such as carbon monoxide, unburned hydrocarbons, nitrogen oxides etc., to carbon dioxide, nitrogen and water, said converter comprising: a catalytic core comprising a rod-like center electrode, at least one metal strip and at least one insulation layer spirally wound together about said center electrode to form a spiral electrical path, said catalytic core having a central region thereof adjacent to said center electrode, in said central region only said strip is wound without an intervening insulation layer and contacts as metal to metal; a metal case for accommodating said catalytic core; and means for supplying an electric power to said catalytic core.

According to this embodiment of the present invention, the insulation layer does not exist in the region adjacent to the center electrode and therefore the electrical resistance in this region is very small. Therefore, there is little heat generated in the region adjacent to the center electrode of the catalytic core. Also, only a part of the catalytic core, particularly, the intermediate region is electrically heated, so that the electric power necessary for heating the catalytic core can be significantly reduced. Also, the intermediate region which contains the insulation layer can be rapidly heated and the temperature thereof can be rapidly raised.

According to another embodiment of the present invention, there is provided an electrically heatable catalytic converter for converting pollutant materials from an engine, such as carbon monoxide, unburned hydrocarbons, nitrogen oxides etc., to carbon dioxide, nitrogen and water, said converter comprising: a catalytic core comprising a rod-like center electrode, at least one metal strip and at least one insulation layer spirally wound together about said center electrode to form a spiral electrical path, said catalytic core having a central region and a peripheral region thereof, in said central region and said peripheral region only said metal strip is wound without an intervening insulation layer and contacts as metal to metal; a metal case for accommodating said catalytic core; and means for supplying an electric power to said catalytic core.

According to the embodiment of the present invention, the insulation layer does not exist in the central region and the peripheral region and therefore the electrical resistance in these regions is very small. Therefore, there is little heat generated in the central and peripheral regions. Therefore, the intermediate region is electrically heated, so that the electric power necessary for heating the catalytic core can be significantly reduced.

DETAILED DESCRIPTION

Figure 1:
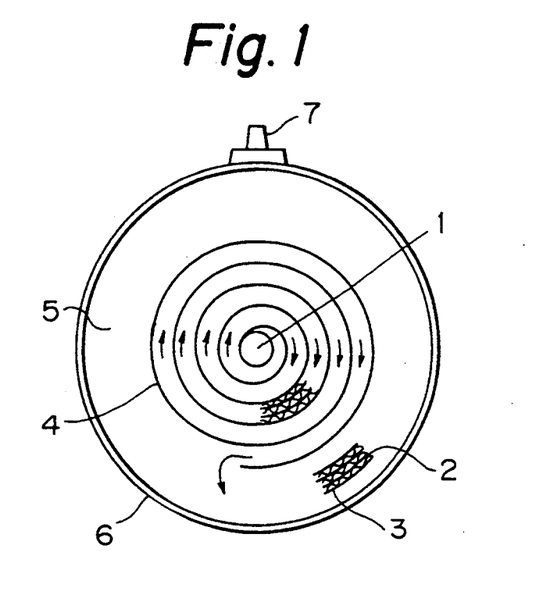
FIG. 1 is a front view of a first embodiment of an electrically heatable catalytic converter according to the present invention.

Referring now to FIG. 1, a first embodiment of an electrically heatable catalytic converter according to the present invention is shown. A rod-like center electrode 1 comprises a metal rod which constitutes a plus electrode. A plurality of corrugated thin metal strips or foils 2 and a plurality of flat or plane thin metal strips or foils 3 are alternately arranged at and connected axially to one side of the center electrode 1. These corrugated and plane metal strips 2 and 3 are preferably made of an alloy or composite material, such as 20% Cr—5% Al—75% Fe and have a thickness of about 50 μm.

As mentioned above and shown in FIG. 1, the corrugated metal strips 2 and the plane metal strips 3 are arranged adjacent to each other except that, in one area of the core, an insulation layer is disposed within the core so that two corrugated strips 2 are in contact with successive windings of the insulation layer, and two plane metal strips 3 separate these corrugated strips 2 from a central corrugated strip 2.

The lengths of the respective corrugated and flat metal strips 2 and 3 from the center electrode 1 are all the same. The length of the insulation layer 4 from the center electrode 1 is, however, shorter than the length of the metal strips 2 and 3. This means that the respective outer areas of the two metal strips are not separated by the insulation layer 4, but directly contact each other.

Figure 2:
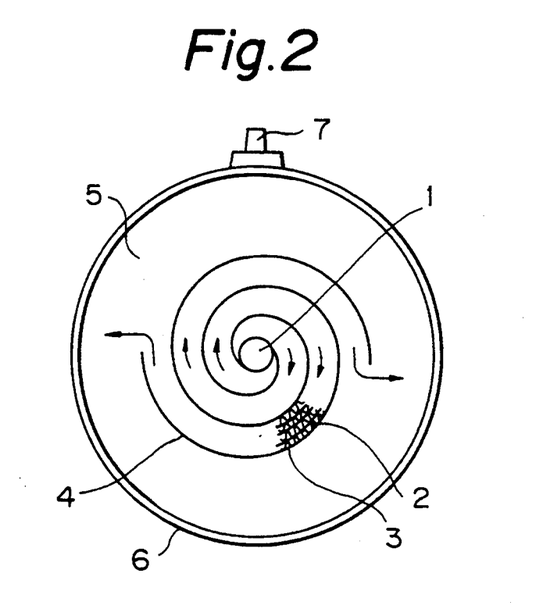
FIG. 2 is a front view similar to FIG. 1, but illustrating an embodiment modified from that of FIG. 1.

In FIG. 2, a modified first embodiment is shown. In this modified embodiment, a plurality of corrugated thin metal strips or foils 2 and a plurality of flat or plane thin metal strips or foils 3 are alternately and symmetrically arranged at and connected to the both sides of the rod-like center electrode 1. Consequently, the left side and right side groups of these corrugated and flat metal strips 2 and 3 are arranged symmetrically with respect to the center electrode 1.

The number of foils, the length of the insulation layer, and so forth can be appropriately selected according to the various conditions, such as the diameter or length of the catalytic core 5, an electric voltage of the power supply including a battery, and so on.

A metal catalytic core 5 is produced by spirally winding the corrugated and plane metal strips 2 and 3 about the center electrode 1. As shown in FIGS. 1 and 2, such a metal catalytic core 5 is cylindrical in shape and has a structure similar to so-called honeycomb structure, which is then inserted into a cylindrical metal case 6 and secured thereto by brazing or the like, so that the catalytic core 1 is electrically connected to the metal case 6. The corrugated and plane metal strips 2 and 3 are secured to each other by brazing or the like for over the entire or partial area thereof. The metal case 6 is electrically connected to another electrode 7 which constitutes a minus, earth electrode.

An active alumina or the like is coated on the core material 5 thus produced as mentioned above. Then, a precious metal, for instance Pt, Pd, Rh or the like, is carried on the core material 5 and an electrically heatable honeycomb catalytic converter can thus be obtained.

The electrically heatable catalytic converter as shown in FIGS. 1 and 2 is disposed in an exhaust passage of an internal combustion or turbine engine in such a manner that an exhaust gas flows in the axial direction of the cylindrical catalytic core 5 or case 6. A non-electrically heatable, main catalytic converter (not shown in the drawings) is usually arranged in the exhaust passage at the downstream side of this electrically heatable converter.

As well known, the catalyzer does not function efficiently (at a high conversion rate), unless the temperature of the exhaust gas is raised to an activation temperature. Therefore, during a cold engine starting period, in which the exhaust gas is relatively cold, the electrically heatable catalytic converter is heated by supplying an electric current to the catalytic core 5 to quickly raise the temperature thereof to an activation temperature so as to be able to convert the pollutant materials contained in the exhaust gas.

As mentioned above, since the length of the insulation layer 4 from the center electrode 1 is shorter than the length of the metal strips 2 and 3, the respective outer areas of the plane strips are not separated by the insulation layer 4. Therefore, the metal strips are wound together and directly contact each other in a peripheral region of the catalytic core 5 adjacent to the metal case 6, as shown in FIGS. 1 and 2. Thus, when a voltage is applied between the central electrode 1 and the earth electrode 7, an electric current flows along a spiral electric path defined by the insulation layers 4, as indicated by arrows in FIGS. 1 and 2. Therefore, the electric path at the central region and the intermediate region of the catalytic core 5 formed by the presence of the insulation layer 4 is a relatively high resistance area, so that the these regions are heated more by the electric power.

On the other hand, the electric path at the peripheral region of the catalytic core 5 which are not separated by the insulation layers 4 becomes a low resistance area, so that a heat generation in this regions is much smaller.

In the previous embodiments as shown in FIGS. 1 and 2, the insulation layer 4 does not exist in the peripheral region of the catalytic core 5 and therefore the electrical resistance in this region is very small, so that there is little heat generation in this region. Therefore, a thermal durability can be improved in the peripheral region which is repeatedly subjected to relatively large thermal stresses. In addition, the outer periphery of the catalytic core 5 can be firmly secured to the metal case.

Figure 3:
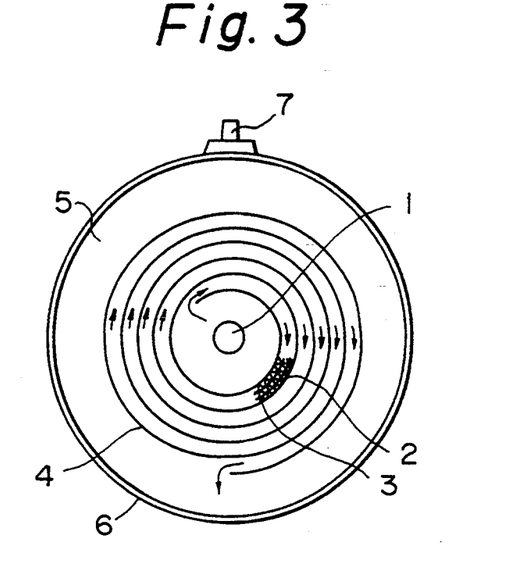
FIG. 3 is a front view of a second embodiment of the present invention.

Referring now to FIG. 3, a second embodiment of an electrically heatable catalytic converter according to the present invention is shown. Parts which are the same as or which correspond to those in the first embodiment are indicated by the same reference numerals, and thus detailed explanations of these parts will be omitted.

In the same manner as the first embodiment, a plurality of corrugated strips 2 and a plurality of flat strips 3 are alternately arranged at and connected axially to one side of the center electrode 1. Although, as mentioned above, the corrugated metal strips 2 and the plane metal strips 3 are arranged adjacent to each other except that, in one area of the core, an insulation layer is disposed within the core so that two corrugated strips 2 are in contact with successive windings of the insulation layer, and two plane metal strips 3 separate these corrugated strips 2 from a central corrugated strip 2.

The lengths of the respective corrugated and flat metal strips 2 and 3 from the center electrode 1 are all the same. However, the length of the insulation layer 4 is shorter than the length of the metal strips 2 and 3, so that the inner and outer areas of the two plane strips are not intervened by the insulation layer 4.

Figure 4:
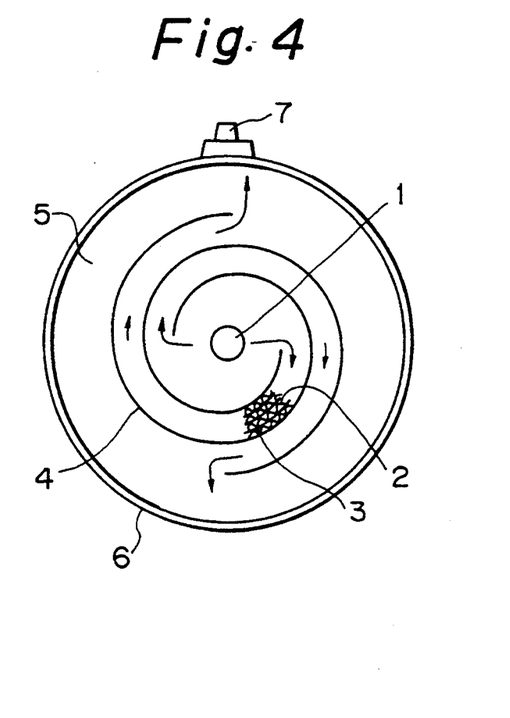
FIG. 4 is a front view similar to FIG. 3, but illustrating an embodiment modified from that of FIG. 3.

In FIG. 4, a modified Second embodiment is shown. In this modified embodiment, a plurality of corrugated thin metal strips or foils 2 and a plurality of flat or plane thin metal strips or foils 3 are alternately and symmetrically arranged at and connected to the both sides of the rod-like center electrode 1. Namely, the left side and right side groups of these corrugated and flat metal strips 2 and 3 are arranged symmetrically with respect to the center electrode 1.

In the same manner as in the first embodiment, a metal catalytic core 5 is produced by spirally winding the corrugated and flat metal strips 2 and 3 about the center electrode 1, as shown in FIGS. 3 and 4, and then inserted and secured to a cylindrical metal case 6.

As clearly understood, since the length of the insulation layer 4 is shorter than the length of the metal strips 2 and 3, the metal strips are wound so as to directly contact each other in a central region of the catalytic core 5 adjacent to the center electrode 1 and a peripheral region of the catalytic core 5 adjacent to the metal case 6, as shown in FIGS. 3 and 4.

Thus, when an electric voltage is applied between the central electrode 1 and the earth electrode 7, electric current flows along a spiral electric path defined by the insulation layers 4. Therefore, the electric path in an intermediate region of the catalytic core 5 thus formed becomes relatively high resistance area. On the other hand,, the electric path in the central region and the peripheral region of the catalytic core 5 becomes low resistance area, so that a heat generation in these regions, particularly in the central region, is much smaller than that in the intermediate region, when a voltage is applied to the catalytic core 5.

In general, a resistance with respect to the gas flow in the central region of the catalytic core 5 is relatively large, because the central region is provided with the center electrode 1 and the corrugated strips 2 in this central region are compressed, so that the cross-sectional area of a plurality of narrow gas passages defined between the corrugated strips 2 and the plane strips 3 is reduced. Therefore, the exhaust gas flow is reduced around the central region of the catalytic core 5.

According to the second embodiment, since there is no insulation layer 4 in the central region of the catalytic core 5. Therefore, and for the following reasons, electric power loss can be reduced in the central region of the core 5 around the center electrode 1.

When an electric voltage is exerted between the central electrode 1 and the earth electrode 7, the electric current flows along a spiral electric path defined by the insulation layers 4, as indicated by the arrows in FIGS. 3 and 4. Therefore, the electric path at the intermediate region of the catalytic core 5 between the central region and the peripheral region formed by the insulation layer 4 becomes a relatively high resistance area, so that the intermediate region is much more heated by the electric power.

On the other hand, the electric paths in the central and peripheral regions of the catalytic core 5 which are not separated by the insulation layer 4 become low resistance areas, so that heat generation in these regions is much smaller. Thus, an electric power loss can be reduced in the catalytic core 5.

Figure 5:
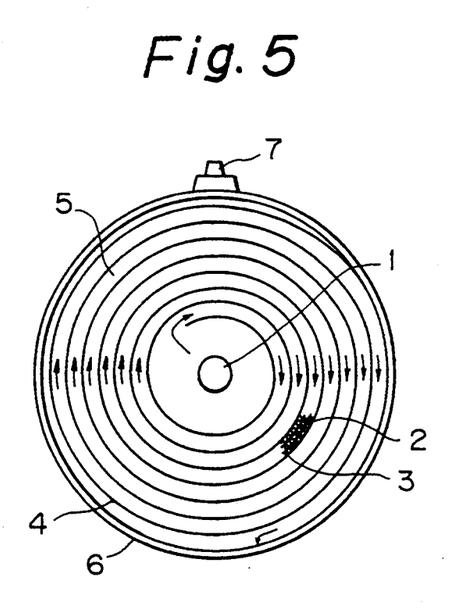
FIG. 5 is a front view of a third embodiment of the present invention.

Referring now to FIG. 5, a third embodiment of an electrically heatable catalytic converter according to the present invention is shown. Parts which are the same as or which correspond to those in the first or second embodiment are indicated by the same reference numerals, and thus detailed explanations of these parts will be omitted.

In the same manner as in the first or second embodiment, a plurality of corrugated strips 2 and a plurality of flat strips 3 are alternately arranged at and connected axially to one side of the center electrode 1. As in the previous embodiments, an insulation layer 4 is arranged between certain selected corrugated strips 3.

The lengths of the respective corrugated and flat metal strips 2 and 3 from the center electrode 1 are all the same. However, the length of the insulation layer 4 is shorter than the length of the metal strips 2 and 3, so that the inner area of the two plane strips are not separated by the insulation layer 4.

Figure 6:
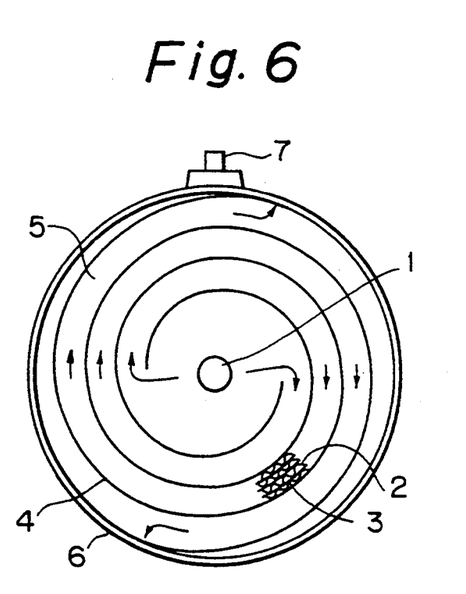
FIG. 6 is a front view similar to FIG. 5, but illustrating an embodiment modified from that of FIG. 5.

In FIG. 6, a modified third embodiment is shown. In this modified embodiment, a plurality of corrugated metal strips 2 and a plurality of plane metal strips 3 are alternately and symmetrically arranged at the left and right and connected to the both sides of the rod-like center electrode 1.

In the same manner as in the first or second embodiment, a metal catalytic core 5 is produced by spirally winding the corrugated and flat metal strips 2 and 3 about the center electrode 1, as shown in FIGS. 5 and 6. The core 5 is then inserted and secured to a cylindrical metal case 6.

As clearly understood, since the length of the insulation layer 4 is shorter than the length of the metal strips 2 and 3, the metal strips are wound so as to directly contact each other in a central region of the catalytic core 5 adjacent to the center electrode 1 as shown in FIGS. 5 and 6.

Thus, when an electric voltage is applied between the central electrode 1 and the earth electrode 7, electric current flows along a spiral electric path defined by the insulation layers 4. Therefore, the electric path in the peripheral region of the catalytic core 5 thus formed becomes a relatively high resistance area. On the other hand, the electric path in the central region of the catalytic core 5 becomes a low resistance area, so that a heat generation in the central region is much smaller than that in the peripheral region, when a voltage is applied to the catalytic core 5.

In the same manner as in the second embodiment, since there is no insulation layer 4 in the central region of the catalytic core 5, electric power loss can be reduced in the central region of the core 5 around the center electrode 1.

Thus, according to several embodiments of the present invention, only a part of the catalytic core 5 is electrically heated. Therefore, an electric power necessary for heating the catalytic core 5 can be significantly reduced.

It should be understood by those skilled in the art that the foregoing description relates only to preferred embodiments of the disclosed invention, and that various changes and modifications may be made to the invention without departing from the spirit and scope thereof.

For instance, although, in the above mentioned embodiments, the insulation layer is arranged or inserted between two plane strips, such an insulation layer can be arranged or inserted between two corrugated strips, or between the corrugated and plane strips.

We claim:

1. An electrically heatable catalytic converter for converting pollutant materials from an engine, such as carbon monoxide, unburned hydrocarbons, nitrogen oxides, etc., to carbon dioxide, nitrogen and water, said converter comprising:

a catalytic core comprising a metal strip and an insulation layer wherein, in a first region of the catalytic core, the metal strip and the insulation layer are spirally wound together to form a spiral electric path so that the insulation layer separates successive windings of the metal strip and wherein, in a peripheral region of the catalytic core, successive windings of said metal strip are in contact metal to metal;

a metal case for containing said catalytic core in such manner that said peripheral region of the catalytic core directly contacts said metal case; and means for supplying electric power to said catalytic core.

2. A catalytic converter as set forth in claim 1, wherein said metal strip comprises a corrugated strip and a plane strip spirally wound together to form a honeycomb catalyzer.

3. A catalytic converter as set forth in claim 2, further comprising a center electrode, about which said corrugated strip and said plane strip are spirally wound.

4. A catalytic converter as set forth in claim 3, wherein said metal strip comprises a plurality of corrugated strips and a plurality of plane strips alternately arranged and spirally wound about said center electrode.

5. A catalytic converter as set forth in claim 3, wherein said metal strip comprises a plurality of corrugated strips and a plurality of plane strips alternately arranged with the insulation layer inserted between preselected adjacent strips in said first region, and wherein said corrugated strips and plane strips are connected axially to one side of said center electrode and spirally wound thereabout.

6. A catalytic converter as set forth in claim 5, wherein the spiral length of said insulation layer from said center electrode is shorter than the spiral length of said corrugated strip and said plane strips from said center electrode.

7. A catalytic converter as set forth in claim 3, wherein said metal strip comprises a first group and a second group, each of the first and second groups comprising a plurality of corrugated strips and a plurality of plane strips alternately arranged, and wherein, in the first region of the catalytic core, the insulation layer is inserted between the first and second groups, said first and second groups being arranged symmetrically with respect to said center electrode, and said corrugated strips and plane strips of the first group are connected axially to one side of the electrode and said corrugated strips and said plane strips of the second group are connected axially to the other side of said center electrode.

8. A catalytic converter as set forth in claim 7, wherein the spiral length of said insulation layers from said center electrode is shorter than the spiral length of said corrugated strips and said plane strips from said center electrode.

9. A catalytic converter as set forth in claim 1, wherein said catalytic core and said metal case are both cylindrical.

10. An electrically heatable catalytic converter for converting pollutant materials from an engine, such as carbon monoxide, unburned hydrocarbons, nitrogen oxides, etc., to carbon dioxide, nitrogen and water, said converter comprising:

a catalytic core comprising a rod shaped center electrode, a metal strip and an insulation layer, wherein, in a first region of the catalytic core, the metal strip and the insulation layer are spirally wound together about said center electrode to form a spiral electrical path so that the insulation layer separates successive windings of the metal strip, said catalytic core having a central region adjacent to said center electrode, wherein, in said central region only, said metal strip is wound without an intervening insulation layer and contacts metal to metal;

a metal case for containing said catalytic core; and means for supplying electric power to said catalytic core.

11. A catalytic converter as set forth in claim 10, wherein said metal strip comprises a corrugated strip and a plane strip and spirally wound together to form a honeycomb catalyzer.

12. A catalytic converter as set forth in claim 11, wherein said metal strip comprises a plurality of corrugated strips and a plurality of plane strips alternately arranged and spirally wound about said center electrode.

13. A catalytic converter as set forth in claim 11, wherein said metal strip comprises a plurality of corrugated strips and a plurality of plane strips alternately arranged and wherein the insulation layer is inserted between preselected adjacent strips, said corrugated strips and plane strips being connected axially to one side of said center electrode and spirally wound about said center electrode.

14. A catalytic converter as set forth in claim 13, wherein the spiral length of said insulation layer is shorter than the spiral length of the preselected adjacent strips, so that said insulation layer is arranged away from said center electrode.

15. A catalytic converter as set forth in claim 11, wherein said metal strip comprises a first group and a second group, each of the first and second groups comprising a plurality of corrugated strips and a plurality of plane strips alternately arranged, and wherein, in the first region of the catalytic core, the insulation layer is inserted between the first and second groups, said first and second groups being arranged symmetrically with respect to said center electrode, and said corrugated strips and plane strips of the first group are connected axially to one side of the electrode and said corrugated strips and said plane strips of the second group are connected axially to the other side of said center electrode.

16. A catalytic converter as set forth in claim 15, wherein the spiral length of said insulation layers from said center electrode is shorter than the spiral length of said corrugated strips and said plane strips from said center electrode.

17. A catalytic converter as set forth in claim 10, wherein said catalytic core and said metal case are both cylindrical.

18. An electrically heatable catalytic converter for converting pollutant materials from an engine, such as carbon monoxide, unburned hydrocarbons, nitrogen oxides, etc., to carbon dioxide, nitrogen and water, said converter comprising:

a catalytic core comprising a rod-shape center electrode, a metal strip and an insulation layer spirally wound together about said center electrode to form a spiral electrical path, said catalytic core having a central region, a peripheral region and an intermediate region between the central and peripheral regions, wherein, in said intermediate region, the insulation layer separates successive windings of the metal strip and wherein, in the central and peripheral regions, successive windings of said metal strip are not separated by said insulation layer so that the successive windings of the metal strip contact metal to metal;

a metal case for containing said catalytic core; and means for supplying electric power to said catalytic core.

19. A catalytic converter as set forth in claim 18, wherein said metal strip comprises a corrugated strip and a plane strip spirally wound together to form a honeycomb catalyzer.

20. A catalytic converter as set forth in claim 19, wherein said metal strip comprises a plurality of corrugated strips and a plurality of plane strips alternately arranged and spirally wound about said center electrode.

21. A catalytic converter as set forth in claim 19, wherein said metal strip comprises a plurality of corrugated strips and a plurality of corrugated strips alternately arranged with the insulation layer inserted between preselected adjacent strips in said intermediate region, and wherein said corrugated strips and plane strips are connected axially to one side of said center electrode and spirally wound thereabout.

22. A catalytic converter as set forth in claim 21, wherein the spiral length of said insulation layer is shorter than the spiral length of the preselected adjacent strips, so that said insulation layer is arranged away from said center electrode and from a peripheral end of said corrugated and plane strips.

23. A catalytic converter as set forth in claim 19, wherein said metal strip comprises a first group and a second group, each of the first and second groups comprising a plurality of corrugated strips and a plurality of plane strips alternately arranged, and wherein, in the intermediate region of the catalytic core, the insulation layer is inserted between the first and second groups, said first and second groups being arranged symmetrically with respect to said center electrode, and said corrugated strips and plane strips of the first group are connected axially to one side of the electrode and said corrugated strips and said plane strips of the second group are connected axially to the other side of said center electrode.

24. A catalytic converter as set forth in claim 23, wherein the spiral length of said insulation layer is shorter than the spiral length of the preselected adjacent strips, so that said insulation layer is arranged away from said center electrode and from a peripheral end of said corrugated and plane strips.

25. A catalytic converter as set forth in claim 18, wherein said catalytic core and said metal case are both cylindrical.

* * * * *

UNITED STATES PATENT AND TRADEMARK OFFICE
CERTIFICATE OF CORRECTION

PATENT NO. : 5,422,082
DATED : June 6, 1995
INVENTOR(S) : Kouji YOSHIZAKI, et al.

It is certified that error appears in the above-indentified patent and that said Letters Patent is hereby corrected as shown below:

Column 2, line 17, before "strip" insert --metal--.

Column 2, line 20, delete "an".

Column 2, line 51, change "the embodiment" to --this embodiment--.

Column 5, line 6, change "intervened" to --separated--.

Column 5, line 7, change "Second" to --second--.

Column 6, line 67, delete the comma after "although".

Column 7, line 48, change "corrugated strip" to --corrugated strips--.

Column 8, line 26, delete "and" between "strip" and "spirally".

UNITED STATES PATENT AND TRADEMARK OFFICE
CERTIFICATE OF CORRECTION

PATENT NO. : 5,422,082
DATED : June 6, 1995
INVENTOR(S) : Kouji YOSHIZAKI, et al.

It is certified that error appears in the above-indentified patent and that said Letters Patent is hereby corrected as shown below:

Column 8, line 37, delete the comma after "strips" and insert --in said first region,--.

Signed and Sealed this

Twenty-first Day of November, 1995

Attest:

BRUCE LEHMAN

Attesting Officer　　Commissioner of Patents and Trademarks